(12) United States Patent
Montaño et al.

(10) Patent No.: US 7,918,220 B2
(45) Date of Patent: Apr. 5, 2011

(54) PORTABLE AND COMPACT GRILL APPARATUS

(76) Inventors: Nevin D. Montaño, Albuquerque, NM (US); Narciso Montaño, Albuquerque, NM (US)

( * ) Notice: Subject to any disclaimer, the term of this patent is extended or adjusted under 35 U.S.C. 154(b) by 49 days.

(21) Appl. No.: 11/828,080

(22) Filed: Jul. 25, 2007

(65) Prior Publication Data

US 2008/0022996 A1 Jan. 31, 2008

Related U.S. Application Data

(60) Provisional application No. 60/834,565, filed on Jul. 28, 2006.

(51) Int. Cl.
*A47J 37/07* (2006.01)
*F24B 1/20* (2006.01)
*F24C 1/16* (2006.01)

(52) U.S. Cl. ........................ 126/9 R; 126/25 R

(58) Field of Classification Search ............... 126/9 R, 126/25 R, 39 R, 38, 41 R, 276, 43
See application file for complete search history.

(56) References Cited

U.S. PATENT DOCUMENTS

| | | | | |
|---|---|---|---|---|
| 1,028,901 A * | 6/1912 | Nelson | ............ | 126/38 |
| 1,169,560 A * | 1/1916 | Murray | ............ | 126/43 |
| 4,587,947 A | 5/1986 | Tomita | ............ | 126/25 R |
| D302,096 S | 7/1989 | Anderson | ............ | D7/402 |
| 4,854,297 A | 8/1989 | Shuman | ............ | 126/30 |
| 4,924,844 A | 5/1990 | Bransburg | ............ | 126/9 R |
| 5,038,749 A * | 8/1991 | Jerry et al. | ............ | 126/40 |
| 5,086,753 A | 2/1992 | Berger | ............ | 126/41 R |
| 5,307,797 A | 5/1994 | Kleefeld | ............ | 126/30 |
| 5,355,867 A | 10/1994 | Hall et al. | ............ | 126/30 |
| 5,558,008 A | 9/1996 | Jenkins | ............ | 99/340 |
| 6,024,082 A * | 2/2000 | Straubel et al. | ............ | 126/41 R |
| 6,119,679 A | 9/2000 | Galvin | ............ | 126/41 R |
| 6,131,560 A | 10/2000 | Healy | ............ | 126/30 |
| 6,257,229 B1 * | 7/2001 | Stewart et al. | ............ | 126/276 |
| D457,029 S | 5/2002 | Wickizer | ............ | D7/332 |
| D457,775 S | 5/2002 | Peloquin | ............ | D7/332 |
| D464,228 S | 10/2002 | Hsu | ............ | D7/337 |
| D464,843 S | 10/2002 | Schulte et al. | ............ | D7/337 |
| 6,470,875 B2 * | 10/2002 | Liu | ............ | 126/25 R |
| 6,883,512 B2 | 4/2005 | Esposito | ............ | 126/9 R |
| 6,951,213 B2 * | 10/2005 | Coleman et al. | ............ | 126/38 |
| 2001/0018914 A1 * | 9/2001 | Shingler | ............ | 126/41 R |
| 2004/0112363 A1 * | 6/2004 | Speck et al. | ............ | 126/41 R |
| 2005/0087182 A1 * | 4/2005 | Schulte | ............ | 126/9 R |

OTHER PUBLICATIONS

Portable Griddle, Model BG3, Star Manufacturing International, Inc.
"A Consumer Guide to Grilling" Health, Patio & Barbecue Association, Arlington, Virginia.

* cited by examiner

*Primary Examiner* — Kenneth B Rinehart
*Assistant Examiner* — Daniel A Bernstein
(74) *Attorney, Agent, or Firm* — Kermit D. Lopez; Luis M. Ortiz; Ortiz & Lopez, PLLC

(57) ABSTRACT

A portable and compact grill apparatus can be implemented in the form of free standing portable propane fueled cooking device, which utilizes one or more legs (e.g., four legs) to support the cooking surface. The device permits a standard propane tank to fit between the legs and directly under the cooking surface. The design permits one of the legs to be removed (by rotating it away from the center) to accommodate the exchange of the propane unit (required for refill of fuel). This design creates a very compact unit due to the fact that the fuel tank, burner and cooking surface all fit in a vertical column thus requiring minimal space.

11 Claims, 7 Drawing Sheets

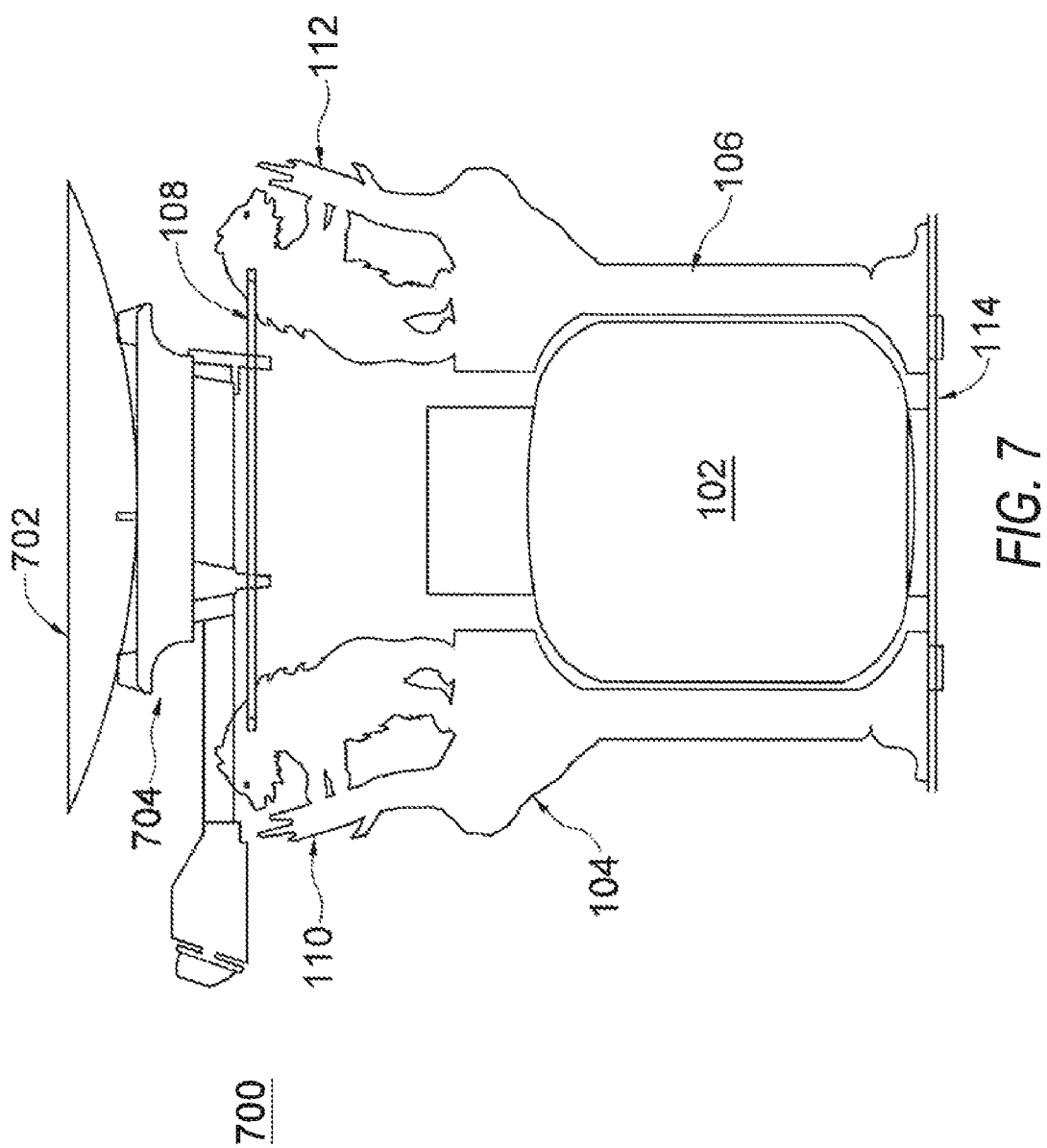

PORTABLE AND COMPACT GRILL APPARATUS

CROSS-REFERENCE TO PROVISIONAL PATENT APPLICATION

This application claims priority from U.S. Provisional Application No. 60/834,565 titled "Portable and Compact Grill Apparatus" and filed Jul. 28, 2006, which is incorporated by reference in its entirety.

TECHNICAL FIELD

Embodiments are generally related to grill devices and systems. Embodiments are also related to portable grill devices.

BACKGROUND OF THE INVENTION

It is a common practice to barbecue stakes, chops, hot dogs and hamburgers on the grill over a charcoal fire. More recently, the outdoor cookout has begun to include other foods such as those best cooked in a cooking utensil known as a "wok". The use of the wok involves cooking techniques incorporating a minimum amount of fats and oils. At times vegetables and meats are cooked for a very short time at high heats. The typical stir-fly recipe calls for a cooking time of less then five minutes. Such rapid cooking combined with the use of small quantities of fat provides substantial health benefits because less fat is absorbed in the food compared with traditional Western style frying. In addition, the wok style of cooking tends to seal the flavor into the food, rendering it more appealing to the palate.

The wok can be easily cleaned and readily reusable for cooking several items on the same menu. The rounded smooth metal surface may be wiped out or dumped for cleaning with little or no residue. Although the wok has many culinary advantages because of its shape, it has fundamental instability problems because of its generally hemispherical shape and relatively small surface on which to rest. The wok was originally developed to be placed directly on hollowed-out sections of coals on the ground and/or on rings with a wide base fire built below. The wok does not adapt well to cooking on modern ranges and as a result a number of devices have been suggested as a substitute for the above mentioned hollowed-out section of coals on the ground.

One of the problems with the use of a wok in combination with an outdoor grill is that the wok needs a consistent fuel source, such as a propane tank. The propane tanks may be difficult to move in and out of place for efficient heating operations. The wok should be supported in place in order to provide fuel for heating the wok.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore, one aspect of the present invention to provide for an improved grill apparatus.

It is another aspect of the present invention to provide for a compact and portable grill apparatus.

The aforementioned aspects and other objectives and advantages can now be achieved as described herein. A portable and compact grill apparatus is disclosed, which can be implemented in the form of free standing portable propane fueled cooking device, which utilizes one or more legs (e.g., four legs) to support the cooking surface. The device is constructed to permit a standard propane tank to fit between the legs and directly under the cooking surface. The design permits one of the legs to be removed (by rotating it away from the center) to accommodate the exchange of the propane unit (for refill of fuel). This design creates a very compact unit due to the fact that the fuel tank, burner and cooking surface all fit in a vertical column thus requiring minimal space.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 7 illustrates a side view of a portable and compact grill apparatus including a burner and cooking surface, in accordance with a preferred embodiment.

DETAILED DESCRIPTION

The particular values and configurations discussed in these non-limiting examples can be varied and are cited merely to illustrate at least one embodiment and are not intended to limit the scope thereof.

Figure 1:
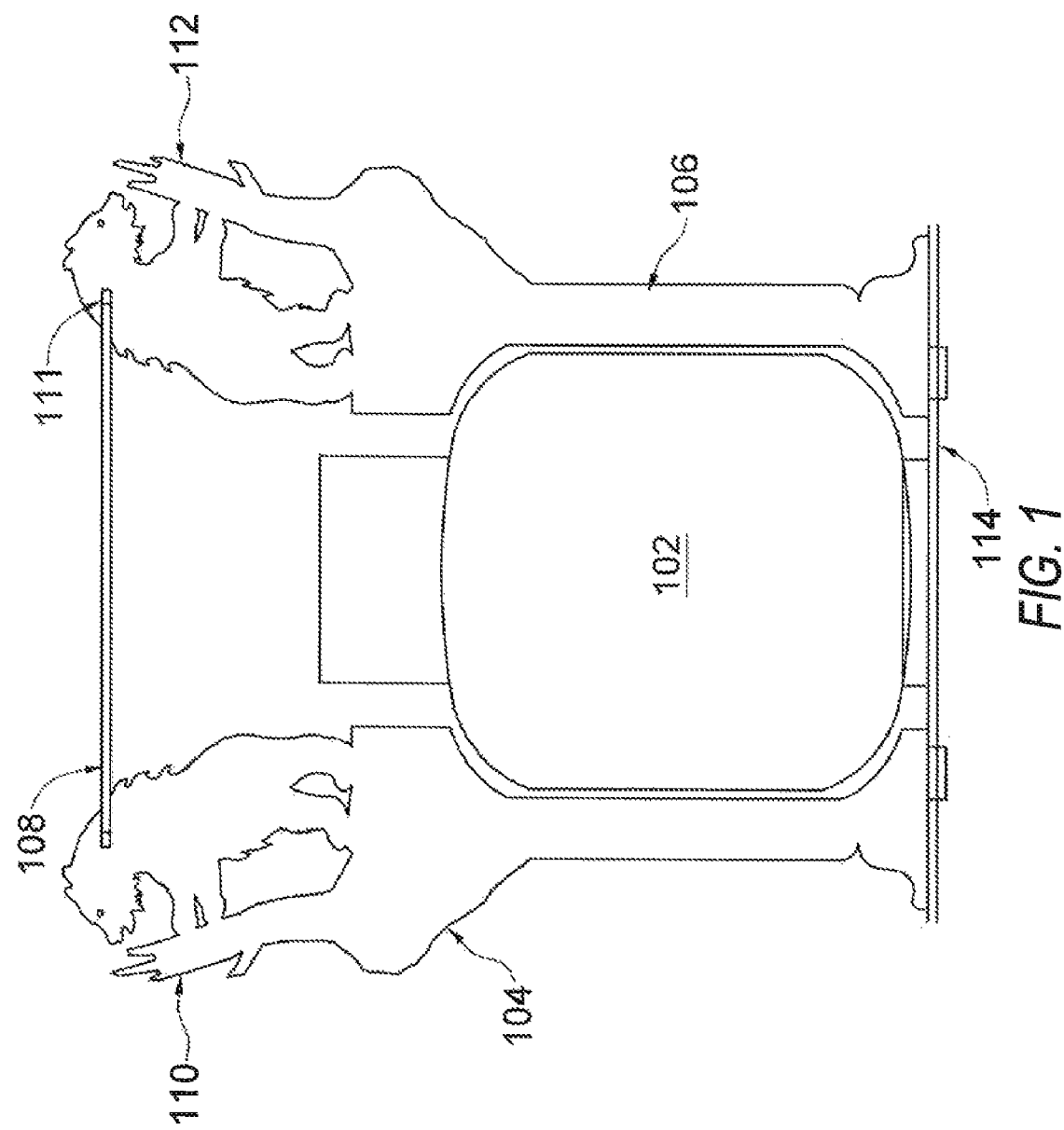
FIG. 1 illustrates a side view of a portable and compact grill apparatus, which can be implemented in accordance with a preferred embodiment.

FIG. 1 illustrates a side view of a portable and compact grill apparatus 100, which can be implemented in accordance with a preferred embodiment. The portable grill apparatus 100 generally includes the use of a removable fuel source 102, which can be provided as, for example, a portable propane fuel tank. Fuel source 102 can thus be a removable propane tank. The apparatus 100 also includes a cooking surface (not shown in FIG. 1) associated with a burner (also not shown in FIG. 1). The cooking surface and the burner are located proximate to the fuel source 102, which provides a fuel for heating the cooking surface via the burner. A plurality of legs 104, 106 can support the cooking surface and the top plate 108. Additionally, a base plate 114 can be provided which supports the fuel source 102. The base plate 114 also supports legs 104, 106 and so forth. The apparatus 100, including its various components and parts, is preferably formed from a steel material, but it can be appreciated that other types of materials may also be utilized depending upon design considerations.

The fuel source 102 removably sits between the legs 104, 106 and directly beneath the cooking surface, which is supported by a top plate 108. One or more of the legs 104, 106 is removable in order accommodate an exchange of the fuel source 102 or refuel the fuel source 102. Each of the legs 104, 106 can be configured to include respective areas 110, 112 that provide customized artwork. One or more of the legs 104, 106 can include a notch such as notch 111 into which the top plate 108 can slide. The notch 111 allows a removable leg 104 or 106 to latch into a secure position, while the other notches can be used to a "fit up" and weld during the production process. Such a notch 111 secures the top plate 108 into a horizontal position and also assists in maintaining a welded connection between the top plate 108 and the leg 106. In the embodiment depicted in FIG. 1, the notch 111 can be formed into the area 112 that is configured for customized artwork or functional art placement or designs (e.g., metal artwork or designs). Although the burner and cooking surface (e.g. a work) are not shown in FIG. 1, it can be appreciated that the fuel source 102, the burner and the cooking surface can be arranged and located in a vertical column in order to limit spacing thereof and provide for a compact configuration for the portable cooking apparatus.

Figure 2:
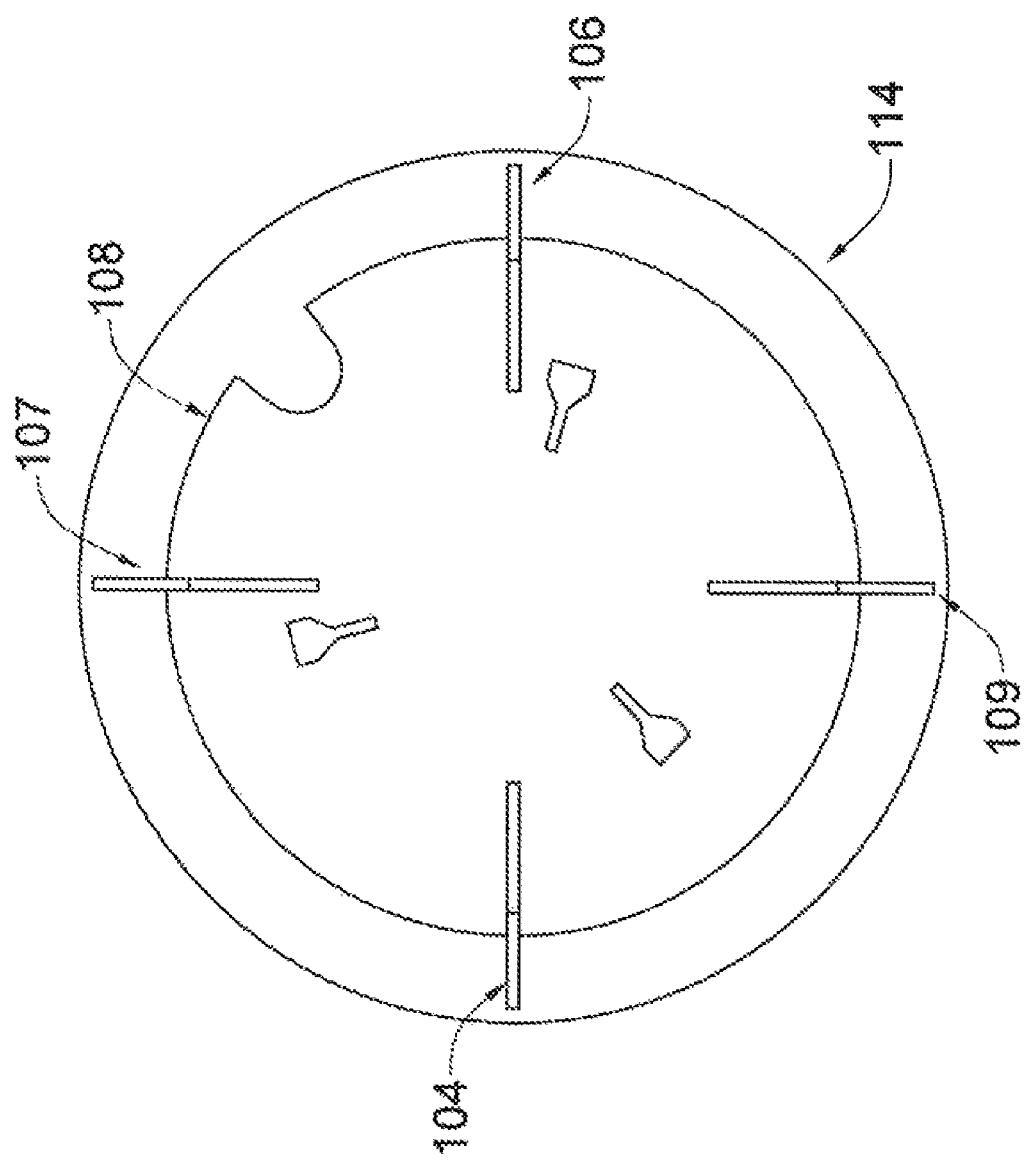
FIG. 2 illustrates a top view of the portable and compact grill apparatus depicted in FIG. 1, in accordance with a preferred embodiment.

FIG. 2 illustrates a top view of the portable and compact grill apparatus 100 depicted in FIG. 1, in accordance with a preferred embodiment. Note that in FIGS. 1-2, identical or similar parts or elements are generally indicated by identical reference numerals. In the top view depicted in FIG. 2, the base plate 114 is illustrated with respect to the legs 104, 106 which are disposed opposite one another and legs 107, 109 which are also disposed opposite one another. Four legs 104, 106 and 107,109 are thus shown in FIG. 2. It can be appreciated that fewer or more legs may be implemented in accordance with alternative embodiments. The top plate 108 is also shown in FIG. 2 with respect to the base plate 114. One or more of the legs 104, 106 and 107, 109 can be removable in order to allow for the installation and removal of the fuel source 102 depicted in FIG. 1.

Figure 3:
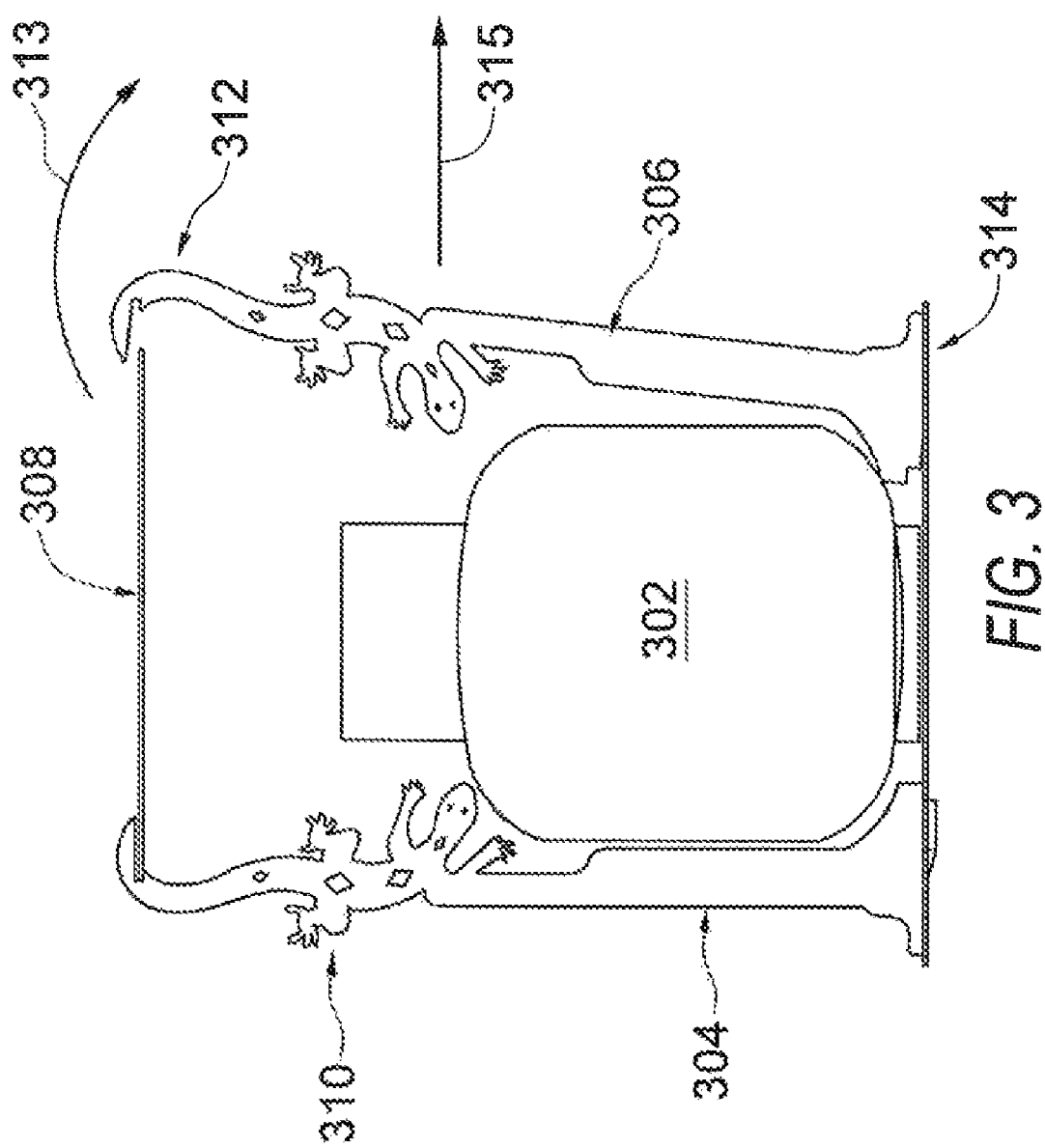
FIG. 3 illustrates a side view of a portable and compact grill apparatus depicting the rotation of one leg to allow removal of a fuel source, in accordance with an alternative embodiment.

FIG. 3 illustrates a side view of a of a portable and compact grill apparatus 300, which can be implemented in accordance with an alternative embodiment. The portable grill apparatus 300 generally includes the use of a removable fuel source 302, which can be provided as, for example, a portable propane fuel tank. Fuel source 302 can thus be a removable propane tank. The apparatus 300 also includes a cooking surface (not shown in FIG. 3) associated with a burner (also not shown in FIG. 3). The cooking surface and the burner are located proximate to the fuel source 302, which provides a fuel for heating the cooking surface via the burner. A plurality of legs 304, 306 can support the cooking surface and the top plate 308. Note that the legs 304, 306 depicted in FIG. 3 are analogous to the legs 104, 106 depicted in FIG. 1.

Additionally, a base plate 314 (which is analogous to the base plate 114 of FIG. 1) can be provided which supports the fuel source 302. Arrow 313 depicted in FIG. 3 indicates that the removable legs 304 and/or 306 can be configured to rotate outward from the propane tank or fuel source 302. Arrow 315 illustrated in FIG. 3, on the other hand, indicates that after a leg 304 and/or 306 has cleared the notch in the top plate 308, the leg 304 or 306 can be pulled up and away from the fuel source 302. Note that the apparatus 300, including its various components and parts, is preferably formed from a steel material, but it can be appreciated that other types of materials may also be utilized depending upon design considerations.

The fuel source 302 removably sits between the legs 304, 306 and directly beneath the cooking surface. One or more of the legs 304, 306 (which is supported by the base plate 314 and in turn supports the top plate 308) is removable in order accommodate an exchange of the fuel source 302 or refuel the fuel source 302. Each of the legs 304, 306 can be configured to include respective areas 310, 312 that provide customized artwork (e.g., functional art). Note that the primary difference between the configuration depicted in FIG. 1 and FIG. 3 is in the presentation of the customized artwork in areas 310, 312. FIG. 3 is provided herein to demonstrate that different customized artwork may be available in areas 310, 312. Although the burner and cooking surface (e.g. a work) are not shown in FIG. 3, it can be appreciated that the fuel source 302, the burner and the cooking surface can be arranged and located in a vertical column in order to limit spacing thereof and provide for a compact configuration for the portable cooking apparatus.

Figure 4:
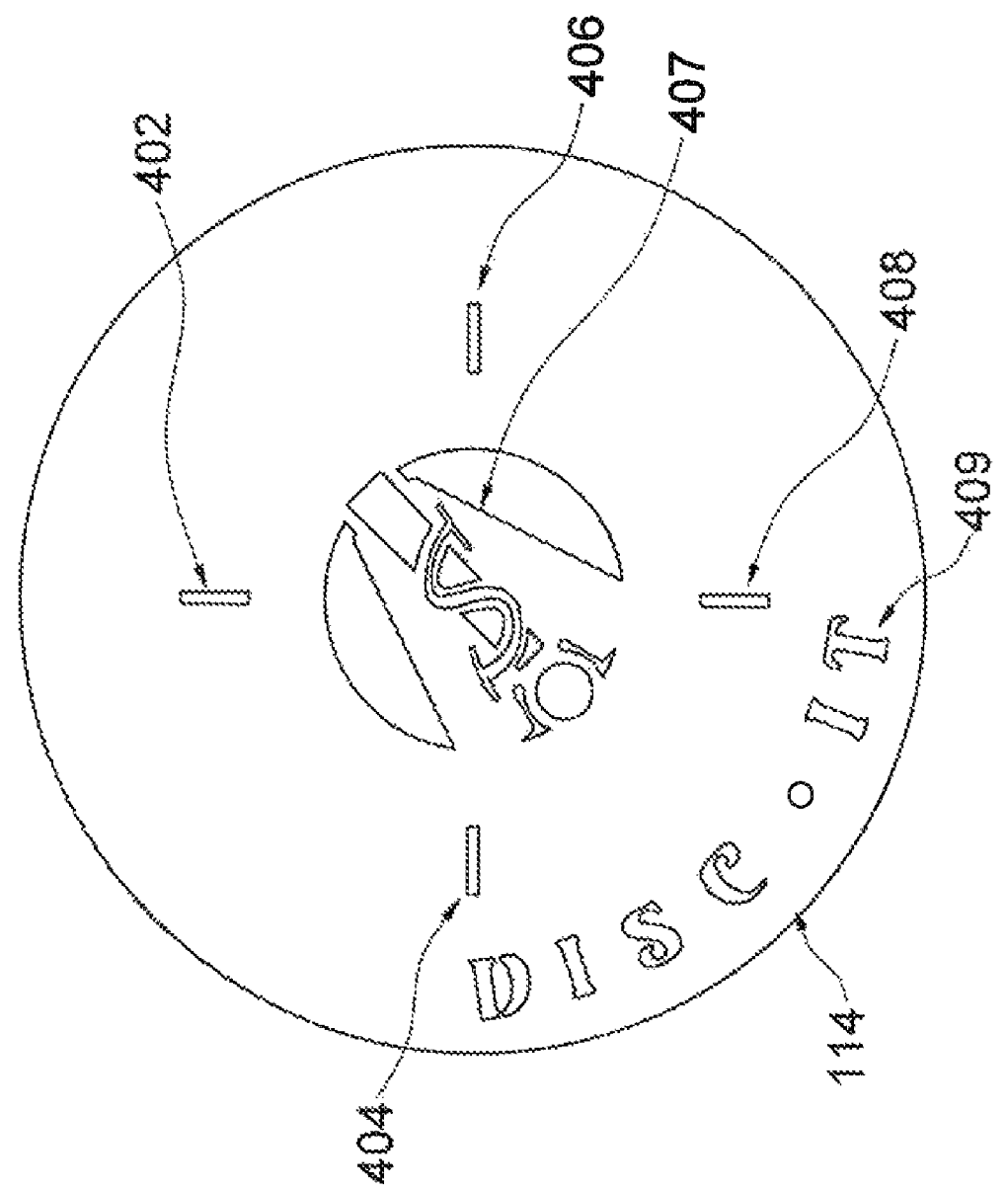
FIG. 4 illustrates a top view of the base plate depicted in FIGS. 1-2, in accordance with a preferred embodiment.

FIG. 4 illustrates a top view of the base plate 114 depicted in FIGS. 1-2, in accordance with a preferred embodiment. Note that in FIGS. 1-2 and 4, identical parts or elements are generally indicated by identical reference numerals. The base plate 114 depicted in FIG. 4 generally includes one or more slots 402, 404, 406, and 408, which receive one or more of the legs 107, 104, 106, 109 depicted in FIGS. 1-2. Leg 107, for example, may slide into slot 402. The other slots/legs operate with respect to one another in a similar arrangement. Additionally, an area can be provided upon which a company logo 407 or trademark may be placed. Such a logo 407 is, of course, merely optional and is not considered a limiting feature of the disclosed embodiments. Another product logo trademark 409 (e.g., "DISC IT") can also be cut into the base plate 114.

Figure 5:
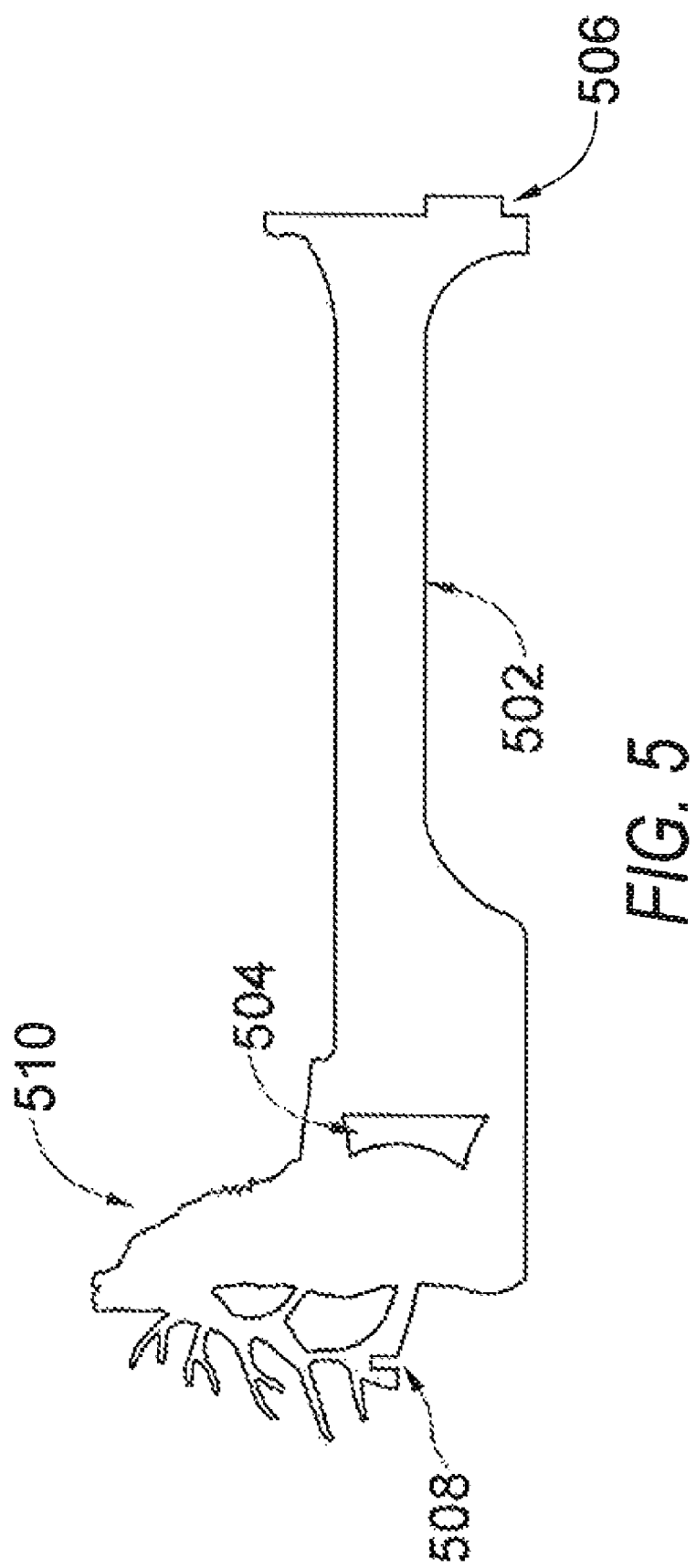
FIG. 5 illustrates a side view of a leg, which can be implemented in accordance with an alternative embodiment.

FIG. 5 illustrates a side view of a leg 500, which can be implemented in accordance with a preferred or alternative embodiment. Note that leg 500 can be implemented in place of or in accordance with legs 107, 104, 106, 109 and/or legs 304, 306, depending upon design considerations. Leg 500 generally includes a curved portion 502 that is so shaped to support and the fuel source 102 and/or 302. Leg 500 includes a tab 506 that can insert into the base plates 114, 314. Leg 500 also can be configured to include a notch 508 for the top plates 108, 308. The notch 508 is similar to the notch 111 depicted in FIG. 1. A tab 506 generally inserts into the base plate 114. It can be appreciated that the particular configuration and artwork associated with leg 500 depicted in FIG. 5 represents merely one possible embodiment. Other configurations and designs or artwork may be implemented in accordance with the embodiments disclosed herein without departing from the scope and spirit of the overall concept.

Figure 6:
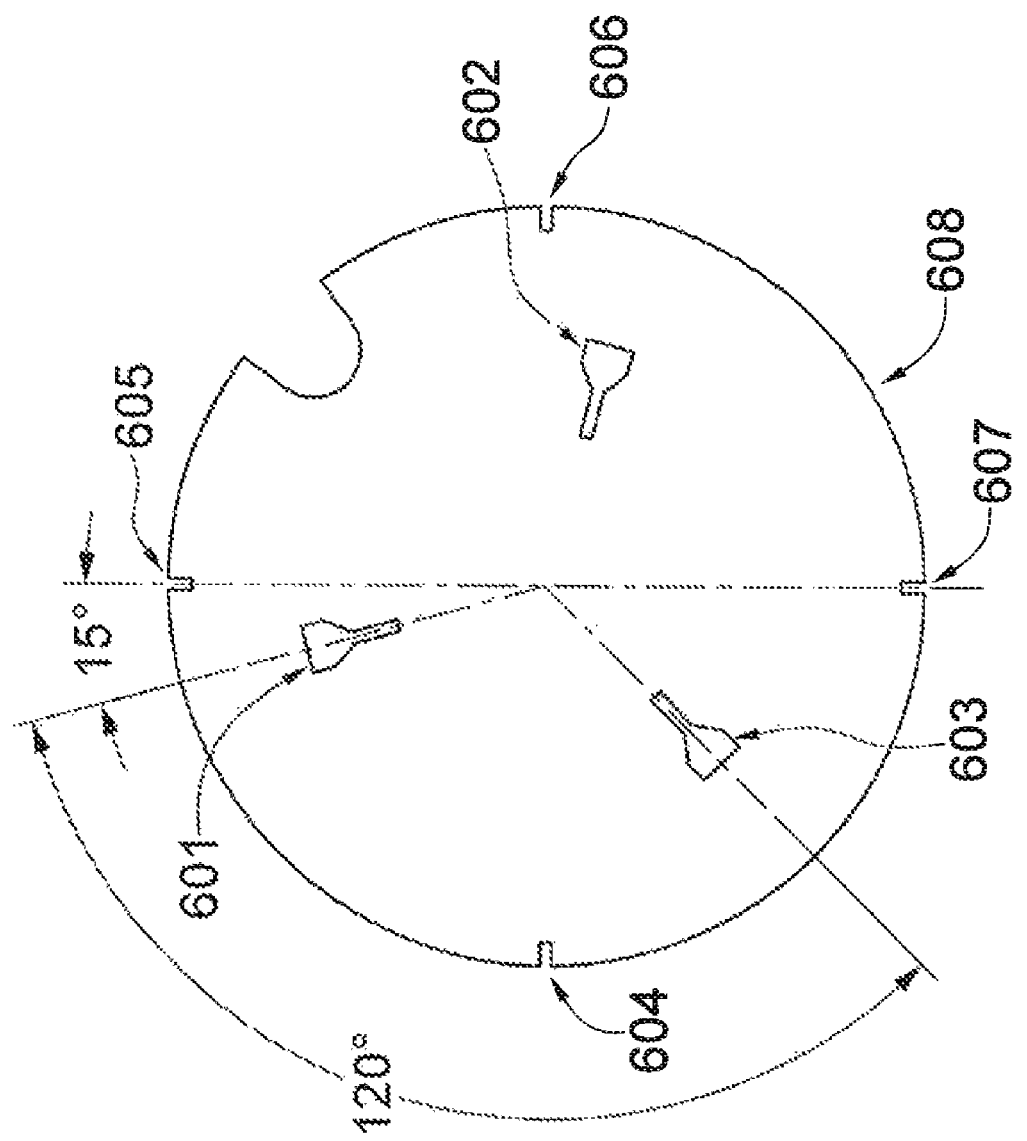
FIG. 6 illustrates a top view of the top plate depicted in FIGS. 1-2, in accordance with a preferred embodiment.

FIG. 6 illustrates a top view of the top plate 108 depicted in FIGS. 1-2, in accordance with a preferred embodiment. The top plate incorporates slots 601, 602 and/or 603, thereby allowing the burner (not shown in FIG. 6) to be bolted to the top plate 108. The top plate 108 can also be configured to include notches 604, 605, 606 and/or 607, which allow the legs 104, 106, 107 and 109 to locate and allow one of the legs (e.g., removable leg 104, which may includes artwork such as artwork 112).

FIG. 7 illustrates a side view of a portable and compact grill apparatus 700 that includes a burner 704 and a cooking surface 702, in accordance with an alternative embodiment. Note that in FIGS. 1-7, identical or similar parts or elements are generally indicated by identical reference numerals. The apparatus 700 generally includes the fuel source 102 (i.e., removable propane tank) and cooking surface 102 (e.g., a Wok-shaped cooking surface) in association with the burner 704.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A portable cooking method, comprising:
providing a removable fuel source comprising a propane tank;
associating a cooking surface with a burner;
associating said burner with a top plate;
supporting said top plate with a plurality of legs; and
configuring said plurality of legs to support said removable fuel source wherein said removable fuel source is centrally disposed between said plurality of legs, and wherein at least one leg of said plurality of legs is removable by outward rotation away from said removable fuel source as said top plate is supported by a plurality of non-removable legs of said plurality of legs in order accommodate an exchange of said removable fuel source or refuel said removable fuel source.

2. The method of claim 1 further comprising configuring said top plate with at least one horizontal interlocking notch which interlocks with a notch in said at least one leg.

3. The method of claim 1 further comprising locating said removable fuel source, said burner and said cooking surface in a vertical column in order to limit spacing thereof and provide for a compact configuration for said portable cooking apparatus.

4. The method of claim 1 further comprising providing a base plate for supporting said removable fuel source and said plurality of legs.

5. The method of claim 1 further comprising:
connecting a top plate that supports said burner to said removable fuel source, wherein said burner provides heat to said cooking surface.

6. A portable grill apparatus comprising:
a portable fuel source;
a top plate;
a base plate;
a plurality of legs supporting said top plate and being connected to said base plate, said plurality of legs comprising horizontal notches into which said top plate fits and is secured in a horizontal position parallel to said base plate;
at least one removable leg having a notch into which said top plate is inserted and a tab portion removably inserted into said base plate such that said removable leg can be removed from said grill apparatus by rotation of said removable leg away from said top plate and removal of said tab portion from said base plate;
wherein said top plate, said base plate, said plurality of legs and said at least one removable leg form a housing for said portable fuel source wherein said portable fuel source is located atop said base plate, is surrounded by said plurality of legs and said at least one removable leg, and is located below said top plate; and
a burner located above said top plate wherein said portable fuel source provides fuel for heating a cooking surface via said burner.

7. The portable grill apparatus of claim 6 wherein said tab portion rotates in a notch in said base plate.

8. The portable grill apparatus of claim 6 wherein said cooking surface comprises a wok.

9. The portable grill apparatus of claim 6 wherein said top plate includes a plurality of interlocking notches which interlock with said horizontal notches in said plurality of legs.

10. The portable grill apparatus of claim 6 wherein said portable fuel source comprises a propane tank.

11. The portable grill apparatus of claim 6 wherein said burner is shaped to support a wok-type cooking surface.

* * * * *